Nov. 13, 1962 — A. REDNISS — 3,063,815
APPARATUS FOR THE CONTINUOUS PRODUCTION OF HYDROGEN HALIDES
Filed May 18, 1959 — 2 Sheets-Sheet 1
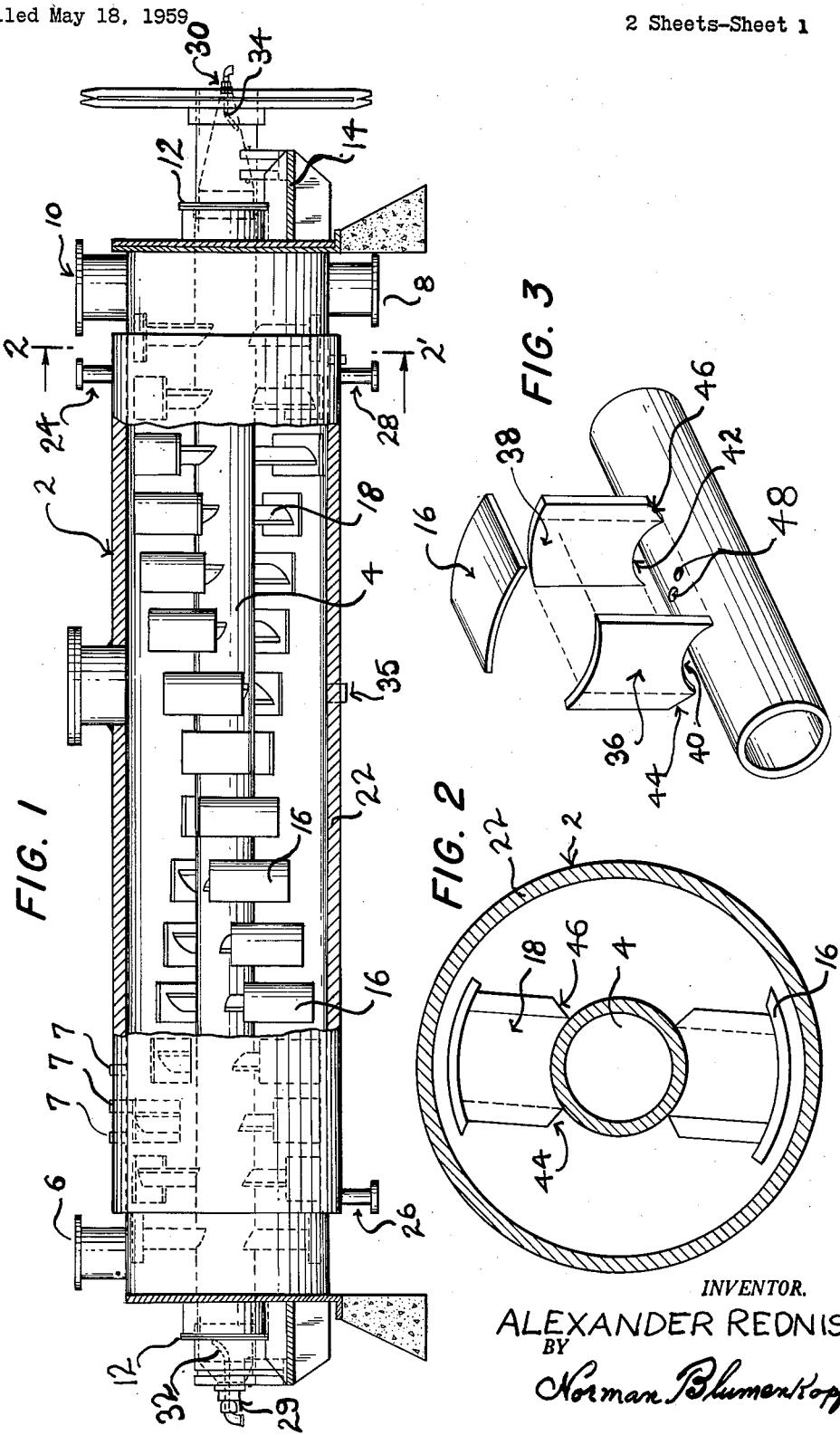
INVENTOR.
ALEXANDER REDNISS
BY
Norman Blumenkopf

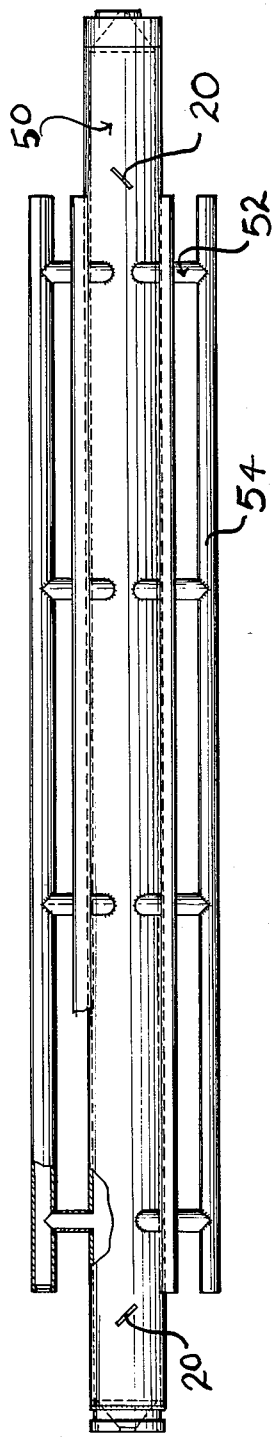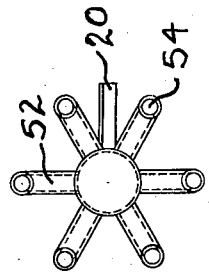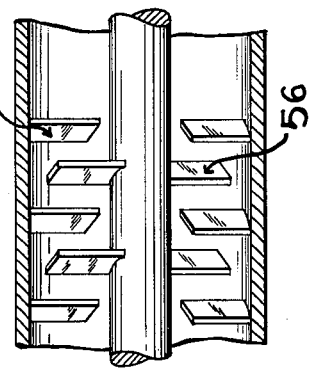

United States Patent Office 3,063,815
Patented Nov. 13, 1962

3,063,815
APPARATUS FOR THE CONTINUOUS PRODUCTION OF HYDROGEN HALIDES
Alexander Redniss, 160 W. 77th St., New York, N.Y.
Filed May 18, 1959, Ser. No. 813,939
5 Claims. (Cl. 23—285)

This invention relates to a new method and apparatus for conducting chemical reactions, whereby the preparation or both organic and inorganic compounds is facilitated, and in particular to the preparation of volatile hydrogen halides, such as hydrogen fluoride and the like.

The preparation of hydrogen halides as such and as precursors for the corresponding hydrohalogen acid is generally carried out by reacting a halide ore or chemical with an acid. In the usual practice, the acid employed is sulphuric acid and in the case of hydrogen fluoride, the ore is fluorspar which is a calcium fluoride-containing ore. Among the various techniques employed for the production of hydrogen halides and in particular hydrogen fluoride, that of a batch-type operation was at first the most common and widespread technique, but today the art is replete with suggestions and proposals for a continuous type of operation, and in fact is the most predominating mode employing either rotary kiln types, agitated reactors with blades rotating, or agitated reactors with stationary blades and rotating casing. In almost all cases such reactors are heated to the necessary reaction temperature, which is about 500° F., by flue gases around the outside shell of the reactor. This is done to avoid dilution of the hydrogen fluoride evolving from the reactor by the said flue gases. In some cases the flue gas is first used to heat the outside shell and is then passed into the interior of the shell where dilution of the hydrogen fluoride is effected. This dilution with water and other non-condensible gases from the flue gases renders the purification of the hydrogen fluoride very difficult and quite costly. Other major and important obstacles in providing of a feasible and acceptable continuous process for the production of hydrogen halides and in particular hydrogen fluoride lie in the difficulties encountered in providing uniformity as to amount of input and output, and uniformity of quality in the output. In addition, the problem of yield which obviously is of great importance and significance, requires exacting control of material input and output, residence time in the reactor, temperature of the reactants and admixture and state of subdivision of the solid reactant and by-products. The reaction of sulphuric acid on calcium fluoride is depicted as follows:

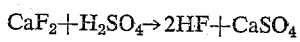

The primary cause of the major difficulties described above is the great tendency of the reaction mass to cake up or solidify. It is a known fact that when a solid is reacting in an endothermic reaction, and one of the products is a solid (such as the calcium sulphate in this instance), the solid forms a substantial insulation between the shell and the agitator. This effect makes it necessary and imperative to heat the flue gas to a much higher temperature than would be normally required to provide the additional heat by way of increased temperature driving force to get the heat through the insulating cake so formed. This is an extremely costly problem from the point of view of increased heat need for the chemical reaction, and also from the view of increased maintenance required due to the excessive temperatures employed. In the aforementioned types of prior art equipment and processes, continuity of operation is seriously hampered and uniformity of operation as a function of time very difficult, thereby negativing most of the advantages accruing from a continuous type of operation.

Obviously, yields too are seriously and adversely affected by this inherent result of the above discussed type of process. It is therefore of paramount importance in operating with the prior art apparatus to attempt to minimize if not entirely eliminate the caking. Overcoming this problem is, by no means, the complete answer. Since the crude fluoride-containing ore is associated with numerous impurities, there are secondary reactions going on within the reactor in addition to the one set forth above. The most serious impurities are silica ($SiO_2$) and calcium carbonate ($CaCO_3$). The former reacts with hydrogen fluoride in accordance with the following equation:

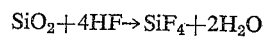

This represents a direct loss of hydrogen fluoride. The calcium carbonate reacts with sulphuric acid as follows:

requiring the use of an excess of acid to give the required theoretical yield of hydrogen halide. In order to minimize this unproductive use of sulphuric acid, the carbonate content of the ore must be kept as low as possible and preferably not above 1.5% by weight based on the weight of the ore. Little in the way of control of reaction conditions can be done to obviate this loss of acid.

It has been discovered that what is to the present commercial mode of operation a great disadvantage, is to the process and apparatus of this invention not only not a detriment but is actually an advantage whereby better yields, more economical operation, smoother performance, and greater purity of product are forthcoming. In other words, the unwanted, insulating by-product of the prior art becomes the wanted and desirable component of the operation of the process and apparatus of the present invention.

It is therefore an object of this invention to provide a new process for effecting chemical reactions, and in particular for the production of hydrogen halides.

It is another object of this invention to provide a process for the production of hydrogen fluoride.

It is still another object of this invention to provide a new process for producing hydrogen fluoride in a high state of purity and in excellent yields.

It is still a further object of this invention to provide a continuous process for the production of hydrogen halides and in particular hydrogen fluoride, in high yields and in a high state of purity.

It is still another object of this invention to provide an apparatus for efficiently carrying out chemical reactions, and in particular, those reactions directed towards the production of hydrogen halides such as hydrogen fluoride, and other similar reactions involving a solid reactant and a solid by-product in an endothermic reaction.

It is still another object of this invention is to provide an apparatus for producing hydrogen fluoride in a continuous manner, in a high state of purity, and in excellent yields.

Other objects will appear hereinafter as the description proceeds of the process and apparatus of this invention. One form of apparatus which may be employed for accomplishing the objects of this invention is illustrated in the accompanying drawing wherein like reference numerals indicate like parts and in which:

FIG. 1 is a longitudinal sectional view through the reactor embodying one form of shaft design;

FIG. 2 is a view of the reactor shaft taken along the line 2—2' of FIG. 1;

FIG. 3 is a partial exploded view of the arm and paddle construction and the associated main shaft;

FIG. 4 is a partial longitudinal sectional view of a modified form of reactor shaft and arm and paddle construction;

FIG. 5 is a cross-sectional view through the middle of FIG. 4; and

FIG. 6 is a partial section of an additional feature of the invention employing disintegrating means on the main shaft.

Referring to the drawings, 2 represents the reactor housing which may be fabricated from any suitable material and preferably is made of steel tubing capable of withstanding 40 pounds' pressure and preferably 80 pounds' pressure, 4 denotes a hollow main reactor shaft located centrally within the tube 2. The latter is provided with a plurality of openings. Of these, 6 is an input or feed inlet for the reactants, which is preferably a slurry of sulphuric acid and halide ore, but which inlet 6 may also be used as an alternate hydrogen halide discharge outlet, 7 is an alternate acid feed inlet, 8 is a solids discharge outlet, and 10 is a gaseous discharge outlet for the hydrogen halide and other gaseous products of the reaction. Shaft 4 is sealed within tube 2 at both ends thereof by the usual seals and bushings and including a shaft gland follower 12. A suitable trunnion support for the reactor housing is designated at 14. Along the length of the main shaft and within the reactor tube are paddles 16 which are attached to shaft 4 by means of hollow arms 18, thereby providing heat exchange communication between the paddles and the main shaft. Also, there may be secured to the main shaft at each end thereof (as shown in FIG. 4) fins or pushers 20, inclined at an angle to provide means for effecting translatory or forward movement of the feed from the input end to the discharge end of the reactor tube. It may be desirable to employ a plurality of such fins along the entire length of the hollow shaft at selected spaced intervals to more efficaciously promote this forward movement. The reactor tube is further provided with a jacket 22 whereby suitable heating and/or cooling of the reactor tube may be effected. This jacket has suitable inlets and outlets 24, 26, and 28 through which the heat exchange medium is circulated. External of the reactor tube and at each end thereof, the main shaft is provided with a rotary union 29 and 30 through which the heat exchange medium to be circulated through the main shaft and hollow arms enters and leaves the said main shaft. Flexible hoses 32 and 34 provide access to these unions. The temperature of the reaction may be followed and thereby controlled by means of a thermometer to be inserted in thermometer well 35. The hollow arms 18, shown in greater detail in FIGS. 2 and 3 are constructed from curved sections of schedule 20 steel. Such sections are readily obtainable from 18″ O.D. steel pipe. Two equal arc-lengths are placed off-center with their concavities facing each other to provide an oval channel. Due to the offset, the resulting composite structure is in the form of an oval tube with oppositely curving projections as extensions from the narrowed portions of the oval. These projections not only aid in effecting satisfactory intermingling of the reactants, but further bear the brunt of the wear due to the abrasive action of the reactants on the elements inside of the reactor. As shown in FIGS. 2 and 3, the hollow arms are fabricated from curved sections 36 and 38, which sections are further adapted to engage the hollow, main shaft by virtue of their conformance to the curvature of the shaft at the areas of contact. These curved sections are designated as 40 and 42. Beyond the areas of contact, there is a cutback portion shown as 44 and 46. The end of the oval arm thusly produced is capped with the paddle 16 which is curved with a radius of curvature approximating that of the reactor housing; thus, there is little opportunity for the reactants to "escape" the action of the arms and paddles. The end of the arms to be capped is of course contoured to the shape of the paddle thereby preventing any escape of heat exchange fluid into the reaction zone. Communicating with the oval opening of the arms at the end where they are secured to the main shaft are openings 48 in the main shaft, which permits the heat exchange fluid to flow into the said hollow arms. It may be desirable, as shown in FIG. 6 to place at the reactants input end of the reactor a plurality of shearing means to aid in breaking up and distributing the solids to be reacted. Such means comprise a series of plates secured alternately to the shaft and to the fixed housing, so that the rotation of the shaft causes a rotary motion of every other plate between two fixed plates. A minimum spacing between the plates is advantageous to effect the maximum shearing action. The shearing plates need only occupy about the first two to three feet of a twelve to fifteen foot long reactor. It may further be desirable to employ slightly curved shearing plates which would give further aid in moving the reactants toward the discharge end. Still further, the blades need not, and as a matter of fact it is preferable that they not be in the same plane, that is, they should be distributed around the periphery of the main shaft on the one hand and around the inside of the housing on the other hand.

In FIG. 4 a modified form of reactor main shaft construction is shown, wherein the centrally disposed hollow shaft 50 is provided with a plurality of radially disposed arms 52 and associated with the said arms and spaced apart from and parallel to said shaft 50 a plurality of elongated, hollow paddles 54. The latter are arranged spaced around shaft 50. The arms 52 need not be of the same length, but it is preferred that they are so. The elongated paddles may run for substantially the entire length of the reactor, except where it is desirable to employ some shearing means at the reactant-input end of the apparatus. Where this is the preferred modification then the construction shown in FIG. 6 may be used for such purposes. In FIG. 5, which as described above, is a cross-sectional view taken through the middle of the modification of the reactor shaft construction, the radial disposition of the arms around the central hollow shaft will be evident, as will the relative position of the fins or pushers used as an aid in moving the reaction mass through the reactor.

In FIG. 6 the shearing plates are designated as 56 for those plates rigidly secured to the rotatable shaft, and 58 for the plates secured to the fixed housing. As has been mentioned above the shearing mechanism is employed particularly when the acid and ore are introduced separately, that is, the acid through alternate feed inlets 7 in order to effect intimate admixture as soon as possible in the reactor. It is also expedient to premix the acid and ore in a pug mill and add same as a slurry. In this instance the shear blades aid in preventing set-up.

In the description which follows, the process is described specifically for the manufacture of hydrogen halides, and particularly, hydrogen fluoride, although it is understood and evident that other suitable and equivalent reactants may be employed in lieu of those specifically set forth.

The general process involves feeding continuously finely divided fluorspar (fineness of 100% through a standard 100-mesh screen) simultaneously with a 5% excess of the stoichiometric amount of 98% sulphuric acid and a minor amount of finely divided solid calcium sulphate, which is obtained from the reactor discharge after the process has been in operation, into the reactor above described. The heated and rotating central shaft maintains the reactants in a constant state of agitation and at the proper reaction temperature of from about 200° C. to about 250° C. By virtue of the technique of supplying the heat for effecting the desired reaction centrally as far as the reaction mass is concerned there is a constant and decreasing temperature gradient outwardly towards the shell or periphery of the reactor. At the periphery, due to the constant agitation and movement of the reaction mass, there is the greatest accumulation and concentration of the evolved hydrogen halide, and in particular, hydrogen fluoride gas. The outer shell or reactor housing as described above is preferably jacketed so that a heat exchange medium may be circulated therethrough to cut down to a minimum heat losses from the reaction mass. The temperature of the shell is maintained at from about 100° C. to about 200° C. and preferably from 150° C. to 180° C. By virtue of the operation of the process as described, it has been found that there is considerably less tendency for the reaction mass to "cake" if the major source of heat energy for the chemical reaction comes from the center of the reaction zone than otherwise. As the reaction mass is conveyed through the reactor by means of the pushers on the main shaft and the arms and paddles, the hydrogen halide production commences as the necessary heat to pass beyond the threshold reaction point or temperature is absorbed by the system. By the proper selection of the feeding-in rate, temperature, and residence time, the solid product emerging at the solids discharge end is substantially pure calcium sulphate with a small amount of calcium carbonate and silica. The gaseous reaction products of hydrogen halide, carbon dioxide, water vapor and silicon tetrachloride are taken off at the gaseous discharge port. The evolved gases may also be taken off at the ore feed end should dusting become a serious problem. By removing gases at the feed end, the counter-current flow of the said gases tends to lessen if not entirely alleviate the dusting problem. The gases taken from the reactor are then passed through a scrubbing tower containing 98% sulphuric acid which removes the water content of the gases and a small amount of hydrogen halide which is soluble in the acid. These gases may also be absorbed in a hydro-halogen acid solution; thus in the production of HF, a 70% solution of HF in water may be used for this purpose. In either case the absorbed hydrogen halide is not lost. Thus where the 98% sulphuric acid is used, after absorption the acid is fortified with 20% oleum to bring the sulphuric acid strength back to 98% after which it is used as acid feed. This acid in the scrubbing tower requires refortification due to the continuous dilution with water from the reaction gases. Where a 70% HF water solution is used as the scrubbing medium, absorption of HF gas concentrates the solution to a higher percentage HF content. This solution then is continuously distilled, taking off an overhead of practically pure HF gas. The foots are substantially 70% and after cooling are returned to the scrubber in a continuous cycle until sulphuric acid or the solids content build up too high. Then fresh 70% HF water solution is employed and the old batch is recovered. From the scrubber the gases are passed to a compressor operating at about 20 pounds' pressure (at this pressure anhydrous hydrogen fluoride is a liquid having a boiling point of 45° C.), and then into a condensing tower preferably equipped with a U-tube heat exchanger through which brine is circulated at a temperature of 0° C. The hydrogen fluoride condenses as an anhydrous liquid and is collected and packaged. The uncondensed gases are given a final scrubbing in a tower by bubbling the said gases through cold 98% sulphuric acid. The cold acid is so maintained by means of brine solution at 0° C. passing through a coil submerged in the sulphuric acid. This final scrubbing removes any last traces of hydrogen fluoride not isolated in the condensing tower. The gases passing through the cold sulphuric acid (mostly carbon dioxide, silicon tetrafluoride and inerts) are discharged to the atmosphere. This final scrubbing acid is periodically returned to the reactor acid feed so that the absorbed hydrogen fluoride can be returned to the system. Instead of discharging the silicon tetrafluoride to the atmosphere, it may be reacted with water in a tower to form $H_2SiF_6$, from which a wide variety of fluorine compounds may be produced. The following examples will serve to illustrate the operation of the process of this invention utilizing the apparatus of this invention in the manufacture of hydrogen halides, and in particular, hydrogen fluoride. In these examples where parts are used it is understood that such parts are by weight unless otherwise specified.

*Example 1*

Into a reactor which is a 20 inch diameter Schedule 80 steel pipe, 12 feet in length, the first two feet of which, at the feed end, have shearing plates which are two inches wide, ¾ inch in thickness, and five inches long, and otherwise constructed as shown in FIG. 1, there are charged:

352 pounds fluorspar (97% calcium fluoride; 1% silica; and 1.5% calcium carbonate)
35 pounds calcium sulphate, and
444 pounds of 98% sulphuric acid (28.5 gallons), after Dowtherm at 300° C. has been flowing through the main shaft and intercommunicating arms to bring the temperature of the reactor up to 250° C. Simultaneously, Dowtherm at 150° C. is circulated through the jacket of the reactor. The main shaft, the diameter of which is 8 inches, is adjusted to a speed of rotation of 2 r.p.m. At this drive the residence time of the reaction mass within the reactor is 60 minutes. At the end of this period of time, solid, pulverulent calcium sulphate is taken off at the solids discharge end (reference numeral 8, FIG. 1). The rate of input feed is adjusted so that the above quantities of materials are fed into the reactor over a one hour period, and the speed of rotation of the main shaft is maintained to give a solids discharge equivalent to the materials input, thereby insuring continuity of operation with the proper temperature and residence time to give the maximum yield of hydrogen fluoride. After the process has been in operation to insure continuity thereof, the evolved hydrogen fluoride is found to be exiting from the reactor (reference numeral 10, FIG. 1) at a temperature of 140° C. The gases are first passed through a cyclone dust collector to remove entrained calcium sulphate. Any suitable apparatus or means may be employed to remove the entrained solids. The gases are then passed into the first scrubber to remove water. They are then compressed and cooled in the condensing tower. The yield of hydrogen fluoride is found to be 160 pounds per hour. The water-scrubber acid has absorbed 11% hydrogen fluoride. When the sulphuric acid concentration of this scrubber has dropped to 96%, it is recycled, after fortification with 12.1 gallons (194 pounds) of oleum per hour. This refortified acid is the acid feed. The acid in the water-scrubber is maintained by a constant supply to replenish the diluted acid which is returned to the reactor after refortification. The gases from the condensing tower are then fed into a final scrubber to remove the last traces of hydrogen fluoride. Periodically, this acid is recycled to the reactor to recover the hydrogen fluoride contained therein, and fresh 98% sulphuric acid or oleum is added to maintain the proper level of acid in this final scrubber.

*Example 2*

The procedure of Example 1 is repeated employing the same reactants in the same amounts, with the following differences. The acid in this example is introduced with the fluoride ore after having been premixed in a heated pug-mill. In Example 1 the acid is introduced through input ports 7 (FIG. 1). In addition, the main shaft has the construction shown in FIG. 4, and no shearing plates are used. A smooth operation giving a high and pure yield results.

*Example 3*

The procedure of Example 1 is repeated. After 240 hours of operation, the operation is stopped and the shaft mechanism is examined. There is very slight wear on the projecting, curved portions of the arms 18.

*Example 4*

The procedure of Example 1 is repeated using instead of the fluoride ore an equivalent amount of a chloride ore assaying 97.5% as sodium chloride. The hydrogen chloride gas is not purified and isolated as is the hydrogen fluoride. The hydrogen chloride is first cooled to remove condensibles (e.g. sulphuric acid) and then absorbed in water in a series of absorbing towers to give hydrochloric acid of 20° Bé.

While the apparatus of this invention has been described for use in processes for the preparation of hydrogen halides and in particular hydrogen fluoride and hydrogen chloride, it is apparent that it is equally adapted for use in the production of other hydrogen halides, and indeed may be employed in other fusion reactions where caking is a serious problem, such as, in the preparation of phenols, naphthols, and the like, by the alkali fusion of the corresponding sulphonated aromatic hydrocarbon.

In addition to the use of Dowtherm as a heat exchange medium, any other suitable and equivalent heat exchange composition or medium may be employed such as mercury (vapor or liquid), the Arochlors, fused metals fused alloys, fused salts, and the like.

Other variations in and modifications of the described processes which will be obvious to those skilled in the art can be made in this invention without departing from the scope or spirit thereof.

I claim:

1. An apparatus for the continuous manufacture of hydrogen fluoride comprising an elongated, stationary, cylindrical reactor tube, centrally disposed therein and for the length of said reactor tube a hollow shaft, rigidly associated with said hollow shaft a plurality of hollow arms extending radially therefrom said hollow arms having opposed arcute projections and agitator means at the ends of said arms, said hollow portions of said shaft and arms communicating with each other, said hollow shaft being further provided exterior of said reactor tube and at each end thereof with means to permit the ingress and egress of a heat exchange fluid, said reactor tube being further provided with means to feed and withdraw materials to be handled therein.

2. An aparatus for the continuous manufacture of hydrogen fluoride comprising an elongated, stationary, cylindrical reactor tube, centrally disposed therein and for the length of said reactor tube, a hollow shaft capable of rotation within said reactor tube, rigidly associated with said hollow shaft a plurality of hollow arms extending radially therefrom, said hollow arms having opposed arcuate projections and at the end of said arms agitator means, each of said agitator means associated with only a single hollow arm, said hollow shaft being further provided exterior of said reactor tube and at each end thereof with means to permit the ingress and egress of a heat exchange fluid, said reactor tube being further provided with means to fed and withdraw materials to be reacted therein.

3. An apparatus as defined in claim 2 wherein the agitator means at the end of the hollow arms is a curved plate sealing the ends of the hollow arms, the curvature of said plate corresponding to the inner contour of the reactor tube.

4. An apparatus for the continuous manufacture of an hydrogen halide comprising an elongated, stationary, cylindrical reactor tube, centrally disposed therein and for the length of the reactor tube a rotatable, hollow shaft, rigidly associated with said hollow shaft a plurality of hollow arms extending radially therefrom, said hollow arms having opposed arcuate projections, agitator means at the ends of said hollow arms, means to feed and withdraw reactants and reaction products from said reactor tube, shearing means within said reactor tube proximate the reactants feed means, the said hollow shaft being further provided exterior of said reactor tube with means to permit the ingress and egress of a heat exchange fluid.

5. An apparatus as defined in claim 4 wherein the shearing means comprise a series of plates alternately secured to the reactor tube and to the hollow shaft whereby rotation of the shaft within the reactor tube causes rotation of alternating shearing plates relative to a fixed shearing plate on either side thereof.

References Cited in the file of this patent

UNITED STATES PATENTS

| 527,899 | Sutton | Oct. 23, 1894 |
| 1,316,569 | Fickes | Sept. 23, 1919 |
| 1,845,128 | Coathron | Feb. 16, 1932 |
| 1,940,585 | Fauth | Dec. 19, 1933 |

FOREIGN PATENTS

| 586,292 | France | Mar. 20, 1925 |